US010335638B2

(12) United States Patent
Gasser et al.

(10) Patent No.: US 10,335,638 B2
(45) Date of Patent: Jul. 2, 2019

(54) TURNING PLATE FOR MEASURING THE PUSHING-OFF FORCES OF SWIMMERS

(71) Applicant: KISTLER HOLDING AG, Winterthur (CH)

(72) Inventors: Reto Gasser, Schnottwil (CH); Adrian Hofmann, Henggart (CH); Florian Ullrich, Dornach (DE); Marc Wehrli, Dornach (CH)

(73) Assignee: Kistler Holding AG, Winterthur (CH)

( * ) Notice: Subject to any disclaimer, the term of this patent is extended or adjusted under 35 U.S.C. 154(b) by 0 days.

(21) Appl. No.: 15/303,079

(22) PCT Filed: Apr. 23, 2015

(86) PCT No.: PCT/CH2015/000060
§ 371 (c)(1),
(2) Date: Oct. 10, 2016

(87) PCT Pub. No.: WO2015/161390
PCT Pub. Date: Oct. 29, 2015

(65) Prior Publication Data
US 2017/0036067 A1  Feb. 9, 2017

(30) Foreign Application Priority Data

Apr. 25, 2014  (CH) ........................................ 628/14

(51) Int. Cl.
*A63B 24/00* (2006.01)
*A63B 69/12* (2006.01)
(Continued)

(52) U.S. Cl.
CPC .......... *A63B 24/0062* (2013.01); *A63B 69/12* (2013.01); *A63B 71/06* (2013.01);
(Continued)

(58) Field of Classification Search
USPC ............................................................ 4/496
See application file for complete search history.

(56) References Cited

U.S. PATENT DOCUMENTS

| 3,230,324 A | 1/1966 | Parkinson |
| 3,522,398 A | 7/1970 | Heimann |
| (Continued) | | |

FOREIGN PATENT DOCUMENTS

| CN | 1793593 | 6/2008 |
| EP | 1 548 410 A2 | 6/2005 |
| EP | 2457623 | 5/2012 |

OTHER PUBLICATIONS

International Search Report, dated Jul. 6, 2015.
(Continued)

*Primary Examiner* — Lauren A Crane
(74) *Attorney, Agent, or Firm* — Dority & Manning, P.A.

(57) ABSTRACT

The invention relates to a turning plate for measuring the pushing-off forces of swimmers in a swimming pool when turning and includes force sensors for determining the pushing-off forces and a stiff plate, which can be secured in a stable position parallel to the pool wall. The turning plate has a stiff rectangular frame on which the stiff plate is secured with pre-tensioning by a clamping screw at four locations, in each case over a force sensor. Moreover, next to each of these force sensors, an adjusting pin is arranged on the frame and can be driven out from the frame in order to support the frame on the pool wall. The frame has at least one, preferably two stiff securing brackets for mounting it on the pool edge, preferably on a starting block.

21 Claims, 2 Drawing Sheets

(51) Int. Cl.
*A63B 71/06* (2006.01)
*E04H 4/14* (2006.01)
*G01L 5/00* (2006.01)
  A63B 5/10 (2006.01)
  H01H 3/14 (2006.01)
  H01H 35/00 (2006.01)

(52) U.S. Cl.
CPC .............. *E04H 4/14* (2013.01); *G01L 5/0038* (2013.01); *A63B 5/10* (2013.01); *A63B 2208/03* (2013.01); *A63B 2220/51* (2013.01); *A63B 2225/60* (2013.01); *H01H 3/14* (2013.01); *H01H 35/003* (2013.01)

(56) References Cited

U.S. PATENT DOCUMENTS

| | | | |
|---|---|---|---|
| 3,784,768 A | | 1/1974 | Hunt |
| 3,916,214 A * | | 10/1975 | Coble, Jr. .......... A63B 71/0605 200/52 R |
| 4,801,771 A * | | 1/1989 | Mizuguchi ........... G10H 1/0558 178/18.05 |
| 5,285,428 A * | | 2/1994 | Rosow ..................... G04F 8/08 368/107 |
| 2005/0135193 A1 | | 6/2005 | Kaski |
| 2009/0298652 A1 | | 12/2009 | Lessard |
| 2012/0192345 A1 | | 8/2012 | Maas |
| 2012/0237754 A1* | | 9/2012 | Kasuga .................. B32B 5/245 428/304.4 |

OTHER PUBLICATIONS

PCT/CH2015/000060 International Preliminary Report on Patentability, dated Oct. 25, 2016.
Chinese Search Report, Application No. 2015800222688, dated Apr. 12, 2018, 2 pages.

* cited by examiner

TURNING PLATE FOR MEASURING THE PUSHING-OFF FORCES OF SWIMMERS

CROSS-REFERENCE TO RELATED APPLICATIONS

This application claims priority to International Application Serial No. PCT/CH2015/000060, filed Apr. 22, 2015, which claims priority to Swiss Application No. 828/14, filed Apr. 25, 2014. International Application Serial No. PCT/CH2015/000060 is hereby incorporated herein in its entirety for all purposes by this reference.

FIELD OF THE INVENTION

The invention relates to a turning plate for measuring push-off forces of swimmers in a swimming pool during turning said turning plate comprising a stiff plate which can be secured in a stable manner parallel to the pool wall as well as force sensors for determining the push-off forces.

BACKGROUND

Nowadays, athletes increasingly use technical appliances in order to optimize movements while training. Therefore, in swimming training, the take-off forces from the starting blocks are measured, for example. Also, devices at the pool wall are known which capture the forces exerted by the swimmers during turning, i.e. when they change their direction at the pool wall. Such conventional turning plates which typically have dimensions of 900×600 mm at a thickness of 100 mm cause problems in particular with respect to the mounting possibilities. Since these turning plates are very heavy with a weight of about 180 kg a crane is usually required for mounting the same. In addition, bore holes must be drilled in the pool wall which adds to the effort and may deteriorate the leak-tightness of the swimming pool. In addition, the turning plates have to be corrosion resistant, especially in heavily chlorinated water in which they are employed. Moreover, the thickness of 100 mm is increasingly less tolerated because the turning plate should not be significantly different from the swimming pool wall. This is particularly important for backstroke starts when the swimmers grab on a bar at the starting block and place their feet on the turning plate.

BRIEF SUMMARY OF THE INVENTION

Therefore, the problem underlying the present invention is to provide a turning plate that is easier to mount.

The problem is solved by a turning plate having the features described hereafter. In particular, the turning plate according to the invention has a stiff rectangular frame on which the plate is secured at four positions under pretension by a clamping screw, in each case via a force sensor. Moreover, next to each of these sensors, an adjusting pin is arranged on the frame that can be moved out of the frame for supporting the frame on the pool wall. The frame has at least one and preferably two stiff securing brackets for mounting it on the pool edge, preferably on a starting block.

Such a turning plate can be lowered easily into the pool by two persons and afterwards be secured on the mounting brackets at mounting positions intended for this purpose arranged above the water surface of the pool, usually on the edge of the pool or on a starting block. Once the turning plate is secured on the mounting brackets, it can be braced on the pool edge by means of the adjusting pins. Therefore, no bore holes in the pool wall are required which is a great advantage.

Further advantageous embodiments are described hereafter.

BRIEF DESCRIPTION OF THE DRAWINGS

In the following, the invention will be explained in more detail with respect to the drawings which show FIG. 1 a schematic representation in cross-section of a detail of a swimming pool with a turning plate according to the invention attached thereto.

DESCRIPTION OF EXEMPLARY EMBODIMENTS OF THE INVENTION

Figure 1:
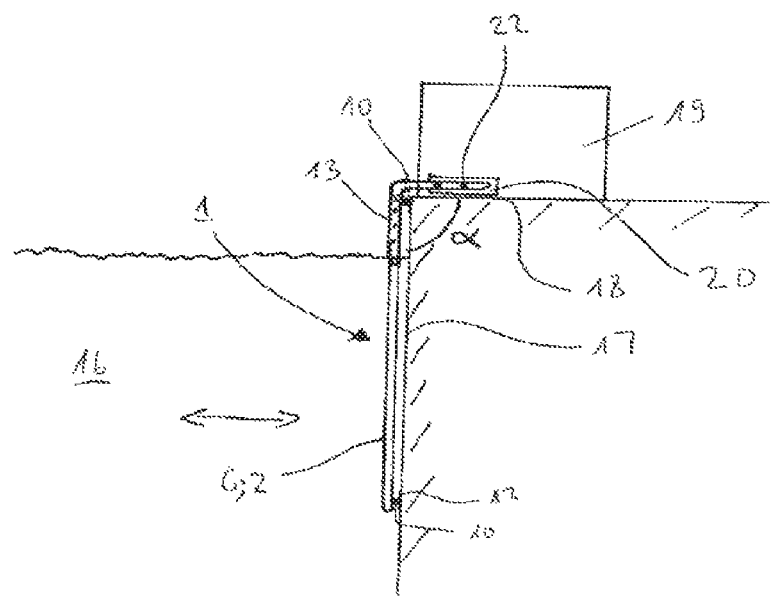

FIG. 1 shows a portion of a swimming pool 18 with a pool wall 17 and a pool edge 18 with a start block 19 arranged thereon. This starting block 19 is provided with a mounting device 20 to which a turning plate 1 according to the invention is mounted. The turning plate 1 could also be mounted directly or indirectly on the edge 18 of the pool.

Figure 2:
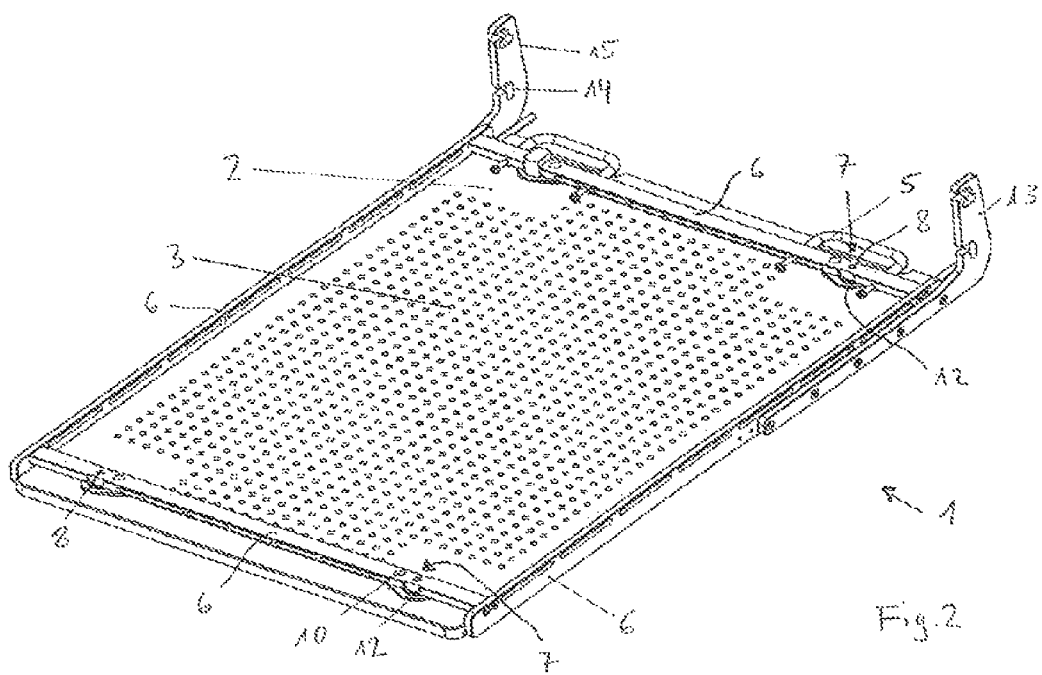
FIG. 2 a representation of a turning plate according to the invention in a perspective view.
Figure 3:
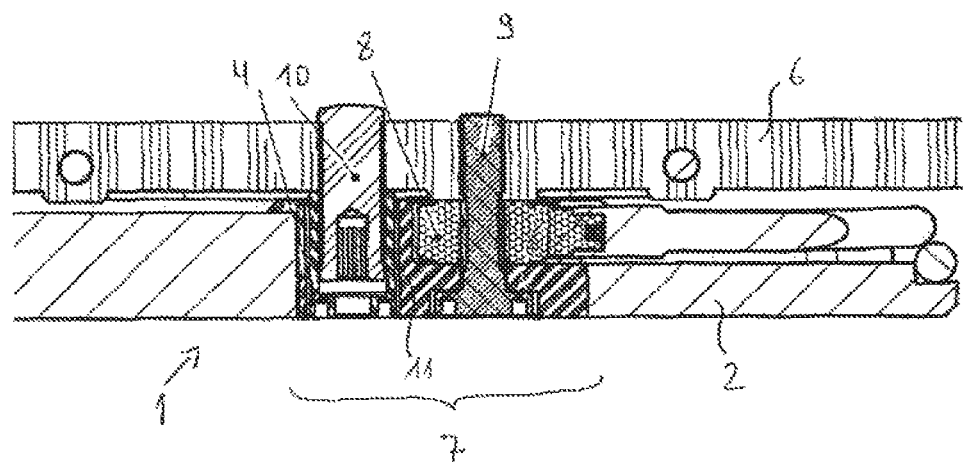
FIG. 3 a cross-section of a turning plate according to the invention in the area of a sensor and an adjusting pin.

FIG. 2 shows such a turning plate 1 according to the invention in a perspective view while FIG. 3 is a detailed view of plate 1 in the area 7 of a force sensor 8 and an adjusting pin 10.

The turning plate 1 is used by the swimmers for measuring push-off forces in a swimming pool 18 when turning and comprises a stiff plate 2 that can be stably secured parallel to the pool wall 17 as well as force sensors 8 to determine the push-off forces. For example, piezoelectric or resistive force sensors 8 can be used that in particular measure in three dimensions.

Furthermore, the turning plate 1 according to the invention comprises a stiff, rectangular frame 6 on which the plate 2 is attached at four positions 7 under pretension by means of a clamping screw 9, in each case via a force sensor 8.

Next to each of these sensors 8, an adjusting pin 10 is arranged on the frame 6 which can be moved out of frame 6 to support the frame 6 on the pool wall 17. The frame 6 has at least one, preferably two stiff securing brackets 13 for mounting it on the pool edge 18, preferably on a starting block 19.

Such a turning plate 1 can be easily carried into a pool 16 and can be assembled outside the water without having to damage the pool wall 17, The adjusting pins 10 can be moved out against the pool wall, for example using an hex-wrench, until the turning plate 1 is uniformly braced. For this purpose, it is advantageous that the plate 2 has a recess 4 flush with each adjusting pin 10 that enables access to the adjusting pin 10. Within this recess 4 is provided a bracket for guiding the adjusting pin 10, This is attached to the frame 6 so that the plate 2 is attached to the frame 6 only by the preloading screw 9 and the force sensor 8. Supporting plates 12 may be arranged behind the adjusting pins 10 to protect the pool wall 17.

Preferably, the plate 2 is made of carbon, for example, of laminated carbon with chlorinated water-resistant resin. This achieves a substantial weight reduction of the turning plate 1, Also, it can be ensured by the construction described that the total thickness of turning plate 1 including the extended adjusting pins 10 does not exceed 50 mm.

Furthermore, it is advantageous if the plate 2 has a plurality of holes 3 for a how wave to pass therethrough which a swimmer approaching the turning plate 1 pushes forward. This provision of holes 3 has been shown to avoid measurement errors. In addition, it is very important that the turning plate 1 must always abut on the pool edge 18 with the adjusting pin 10 or the supporting plates 12 attached thereto because otherwise the measurement will also be falsified.

Preferably, the frame 6 is made of high-quality stainless steel that is resistant to chlorine and ozone. This is also true for all screws and additional components of the turning plate 1. Since swimming pool water can be very aggressive.

Frame 6 preferably has at least one, more preferably two handles 5 that facilitate its handling during mounting.

Figure 4:
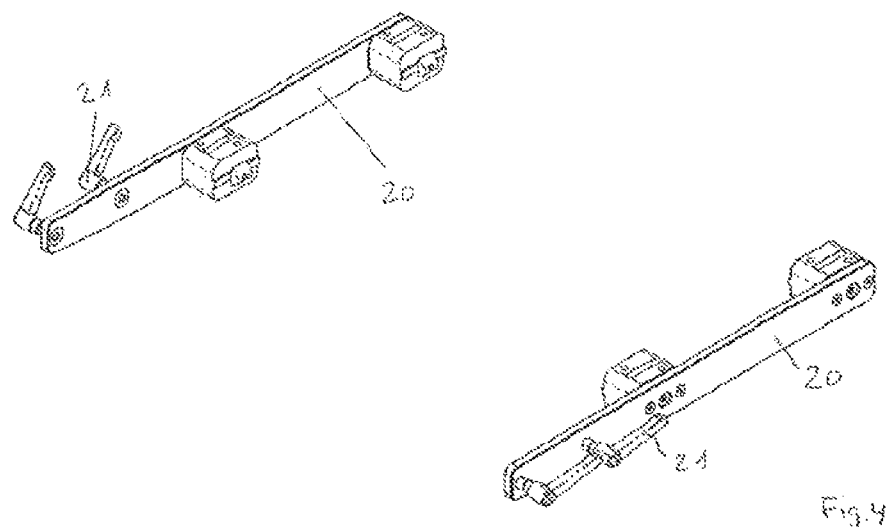
FIG. 4 a mounting device for mounting a turning plate according to the invention in a perspective view.

In a preferred embodiment, the turning plate 1 comprises a mounting device 20, shown in FIG. 4, which can be fixed on the pool edge 18 or on a starting block 19 to accommodate the securing bracket or brackets 13. Preferably, the mounting device 20 has at least a quick release 21 for quick mounting of the turning plate 1 to the mounting device 20.

The accommodation between mounting device 20 and securing bracket 13 can be designed to be tilt adjustable so that the turning plate 1 can be attached with an inclination to the vertical of up to 5 degrees, preferably up to 10 degrees. This is Important when as shown in FIG. 1 for example the angle α of the pool wall 17 to the pool edge 18 is more than 90°, In this way, the position of the turning plate 1 can be optimally adapted to the angle of pool wall 17.

Additionally, the accommodation between mounting device 20 and securing bracket 13 can be horizontally slidable in the swimming direction, which is indicated by a double-headed arrow in FIG. 1, so that the turning plate 1 can be attached as close as possible to the pool wall 17. Alternatively or in addition, mounting device 20 can also be attached to a starting block 19 so that it is horizontally slidable in the swimming direction.

Preferably, each bracket 13 is attached in two positions with a fixed component on the edge of the pool and the brackets 13 are themselves locked by quick releases 21, for example. For this purpose, each securing bracket 13 has two slits 14 wherein both slits 14 have an L shape and at least one of the two slits has a wide transversal slit 15 at the inner end of the L for varying the angle α during mounting. Therefore, the turning plate 1 according to the invention with a size of the plate 2 of about 900×800 mm can be designed to be movable while having a total weight of less than 30 kg and thus can be easily carried and mounted by two persons.

LIST OF REFERENCE NUMERALS

1 turning plate
 2 plate
 3 holes
 4 recess
 5 handle
 6 frame
 7 position of sensor and adjusting pin
 8 force sensors
 9 clamping screw
 10 adjusting pin
 11 socket
 12 supporting plate
 13 securing bracket
 14 slit, L-shaped slit
 15 transversal slit
 18 swimming pool
 17 pool wall
 18 pool edge
 19 starting block
 20 mounting device
 21 quick release
 α angle of pool edge

The invention claimed is:

1. A turning plate for measuring push-off forces of swimmers during turning in a swimming pool defined in part by a pool wall that is disposed generally normal to a pool edge, comprising:
   a stiff plate,
   at least four force sensors for detecting the push-off forces applied by swimmers to the stiff plate,
   a stiff, rectangular frame on which the plate is mounted on in at least four locations under pretension with a respective clamping screw and a respective force sensor.

2. The turning plate according to claim 1, wherein next to each of these force sensors an adjusting pin is carried by the frame and adjustable to change the distance between the frame and the pool wall.

3. The turning plate according to claim 2, wherein the adjusting pin can be moved out against the pool wall until the turning plate is uniformly braced.

4. The turning plate according to claim 2, wherein the plate has a recess flush with each adjusting pin which enables access to the adjusting pin.

5. The turning plate according to claim 1, wherein the frame has at least two stiff securing brackets for mounting on the edge of the pool.

6. The turning plate according to claim 1, wherein the plate is made of carbon.

7. The turning plate according to claim 1, wherein the plate has a plurality of holes for a bow wave to pass therethrough.

8. The turning plate according to claim 1, wherein the frame together with the plate is not thicker than 50 mm.

9. The turning plate according to claim 1, wherein the frame has at least one handle which facilitates handling during mounting of the frame to the pool.

10. The turning plate according to claim 5, further comprising a mounting device that can be secured on the pool edge or on a starting block and connected to the securing brackets.

11. The turning plate according to claim 10, wherein the mounting device has a means for quick attachment of the turning plate to the mounting device.

12. The turning plate according to claim 10, wherein the spatial relationship between the mounting device and the securing bracket is tilt-adjustable so that the turning plate can be mounted with an inclination to the vertical of up to 10 degrees.

13. The turning plate according to claim 10, wherein the mounting device lies generally in a first plane that is spaced apart in a swimming direction from a second plane in which the securing bracket generally lies, and the securing bracket is horizontally slidable in the swimming direction so that the turning plate can be attached as close as possible to the pool wall.

14. The turning plate according to claim 10, wherein the mounting device can be attached to a starting block so that it is horizontally slidable in the swimming direction.

15. A turning plate for measuring push-off forces of swimmers during turning in a swimming pool defined in part by a pool wall that is disposed generally normal to a pool edge, comprising:
- a stiff plate;
- at least four force sensors for detecting the push-off forces applied by swimmers to the stiff plate;
- a stiff, rectangular frame on which the stiff plate is mounted on in at least four locations under pretension with a respective clamping screw and via a respective force sensor;
- wherein the frame has at least two stiff securing brackets for mounting on the edge of the pool; and
- wherein each securing bracket can be attached in two locations by a fixed component to the pool edge, each securing bracket having two slits wherein both of said slits are L-shaped and at least one of the two slits has a wide transversal slit at the inner end of the L for varying during mounting of the turning plate an inclination angle between the stiff plate and the pool edge.

16. The turning plate according to claim 1, wherein the turning plate is movable with a total weight of less than 30 kg and has a surface area of about 900×600 mm.

17. The turning plate according to claim 1, wherein the frame has at least two stiff securing brackets for mounting on a starting block that is disposed on the edge of the pool.

18. The turning plate according to claim 1, wherein the plate is made of laminated carbon with chlorinated water-resistant resin.

19. The turning plate according to claim 10, wherein the spatial relationship between the mounting device and the securing bracket is tilt-adjustable so that the turning plate can be mounted with an inclination to the vertical of up to 5 degrees.

20. The turning plate according to claim 1, wherein one of the force sensors is configured to measure in three dimensions.

21. A turning plate for measuring push-off forces of swimmers during turning at an end wall of a swimming pool, comprising:
- a stiff plate defining a center plane;
- a stiff rectangular frame that carries the turning plate, the stiff rectangular frame being configured for being stably attached to the end wall with the center plane of the stiff plate disposed at a predetermined orientation with respect to the end wall, the stiff rectangular frame being connected at four locations to the stiff plate, each of the four locations being spaced apart from one another; and
- a plurality of force sensors configured and disposed for detecting the push-off forces exerted against the stiff plate by the swimmers when turning, each one of the plurality of force sensors being spaced apart from each other; and
- wherein the stiff plate has a plurality of holes configured for a bow wave to pass therethrough.

* * * * *